United States Patent
Showalter

(10) Patent No.: US 6,941,833 B2
(45) Date of Patent: Sep. 13, 2005

(54) SHIFT ASSEMBLY FOR A SINGLE FORK SHIFT ASSEMBLY

(75) Inventor: Dan Joseph Showalter, Plymouth, MI (US)

(73) Assignee: BorgWarner Inc., Auburn Hills, MI (US)

( * ) Notice: Subject to any disclaimer, the term of this patent is extended or adjusted under 35 U.S.C. 154(b) by 203 days.

(21) Appl. No.: 10/365,366

(22) Filed: Feb. 12, 2003

(65) Prior Publication Data

US 2004/0154425 A1 Aug. 12, 2004

(51) Int. Cl.[7] .............................................. B60K 17/04
(52) U.S. Cl. ................................ 74/473.12; 74/473.36
(58) Field of Search ............................ 74/473.1, 473.12, 74/473.18, 473.21, 473.23, 473.24, 473.36, 473.37

(56) References Cited

U.S. PATENT DOCUMENTS

| 2,634,622 A | * | 4/1953 | Cripe ........................... 74/335 |
| 3,120,761 A | | 2/1964 | Pravel |
| 3,869,925 A | | 3/1975 | Brems |
| 4,428,248 A | * | 1/1984 | Broucksou et al. ........... 74/335 |
| 4,550,625 A | * | 11/1985 | Martin et al. ................. 74/335 |
| 4,873,881 A | | 10/1989 | Edelen et al. |
| 5,150,629 A | | 9/1992 | Morris et al. |
| 5,180,959 A | * | 1/1993 | Christopher ................. 318/626 |
| 5,832,777 A | | 11/1998 | Weilant |
| 5,878,624 A | | 3/1999 | Showalter et al. |
| 5,881,853 A | | 3/1999 | Peuster et al. |
| 5,884,526 A | | 3/1999 | Fogelberg |
| 6,095,004 A | * | 8/2000 | Ota et al. .................. 74/336 R |
| 6,173,624 B1 | | 1/2001 | Decker |
| 2003/0100397 A1 | * | 5/2003 | Lee ............................ 475/149 |
| 2004/0154425 A1 | * | 8/2004 | Showalter ................. 74/473.36 |

* cited by examiner

Primary Examiner—David M. Fenstermacher
(74) Attorney, Agent, or Firm—Brinks Hofer Gilson & Lione; Greg Dziegielewski

(57) ABSTRACT

A shift assembly for a transfer cases, manual and semi-automatic transmissions comprises a drive motor having a worm gear output which engages and drives a gear having an eccentric drive pin disposed parallel to and offset from the axis of a rotation of the gear. The drive pin engages a slot in a shift fork which extends normal to the axis of movement of the shift fork and associated speed change or gear shift mechanism. The shift fork is disposed upon and supported by a shift rail. Uni-directional or bi-directional rotation of the drive motor rotates the gear and sequentially moves the eccentric pin, shift fork and shift mechanism between first and second terminal positions and, typically, a center or intermediate, neutral position.

17 Claims, 5 Drawing Sheets

US 6,941,833 B2

SHIFT ASSEMBLY FOR A SINGLE FORK SHIFT ASSEMBLY

BACKGROUND OF THE INVENTION

The invention relates generally to shift assemblies for use in transfer cases, manual transmissions and the like and more particularly to a shift assembly for transfer cases, manual transmissions and the like having a single shift fork assembly.

In two speed transfer cases and certain manual transmissions, there is a need to shift or translate a component of speed change gearing such as a dog clutch or clutch collar from a first position which engages a first component to provide a first drive ratio and speed range through an intermediate position to a second position which provides a second, a distinct drive ratio and speed range. Frequently, such a device may also provide a selectable center or intermediate neutral position between the first and second positions. Numerous mechanical drive mechanisms intended to achieve this function have been both developed and patented.

U.S. Pat. No. 4,873,881 teaches a shift actuator having a pair of drive motors which cooperatively provide X and Y axis movement of a shift rail.

In U.S. Pat. No. 5,150,629, a rotary actuator includes a shaft which is driven both linearly and rotatively to provide proper gear selection.

U.S. Pat. No. 5,180,959 utilizes a worm gear drive to a gear having an eccentric pin. The device includes a reaction member which provides a resilient coupling between the motor drive and shifted member.

U.S. Pat. No. 5,832,777 which is co-owned by the present assignee includes a worm gear drive which directly axially translates the shift rail and fork.

U.S. Pat. No. 5,881,853 discloses an arrangement for actuating a gear box shift mechanism which includes a circular cam driven by a worm gear.

U.S. Pat. No. 5,884,526 discloses a shift mechanism having an eccentric drive coupled to a single shift rail.

Several of the foregoing patents, while apparently providing accurate and reliable shift operation, are complex and thus problematic from manufacturing, reliability and service standpoints. The foregoing suggests that improvements in the art of single fork shift mechanisms are therefore both desirable and possible.

BRIEF SUMMARY OF THE INVENTION

A shift assembly for a transfer cases, manual and semi-automatic transmissions comprises a drive motor having a worm gear output which engages and drives a gear having an eccentric drive pin disposed parallel to and offset from the axis of a rotation of the gear. The drive pin engages a slot in a shift fork which extends normal to the axis of movement of the shift fork and associated speed change or gear shift mechanism. The shift fork is preferably disposed upon and supported by a shift rail. Uni-directional or bi-directional rotation of the drive motor rotates the gear and sequentially moves the eccentric pin, shift fork and shift mechanism between first and second terminal positions and, typically, a center or intermediate, neutral position.

The shift assembly generates higher forces at slower speeds proximate the first and second terminal positions and faster speeds and lower forces near the intermediate position which corresponds to the torque and speed requirements and preferences of a typical shift assembly.

It is thus an object of the present invention to provide a single fork shift assembly having a worm gear drive from a motor to a camwheel.

It is a further object of the present invention to provide a shift assembly which may be driven by either a bi-directional or uni-directional drive motor.

It is still further object of the present invention to provide a shift assembly having a camwheel containing an eccentric pin which engages a transverse slot in a shift fork.

It is a still further object of the present invention to provide a shift assembly generating greater force and slower speed at terminal or gear selecting positions and lesser force and greater speed in intermediate regions.

Further objects and advantages of the present invention will become apparent by reference to the following description of the preferred embodiment and appended drawings wherein like reference numbers referred to the same component, element or feature.

DETAILED DESCRIPTION OF THE INVENTION

Figure 1:
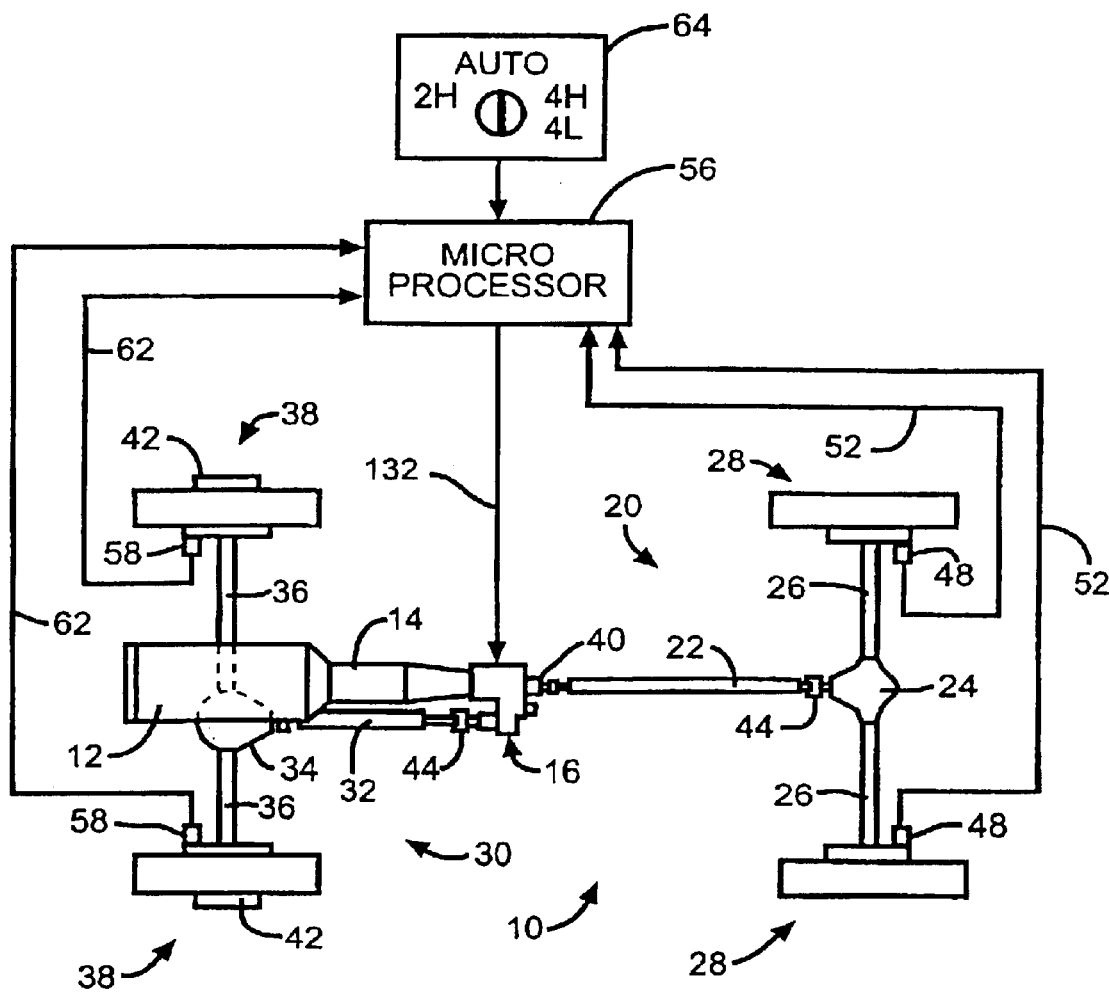
FIG. 1 is a diagrammatic view of a drive assembly of a four-wheel drive motor vehicle having a transfer case incorporating the present invention.

Referring now to FIG. 1, a four-wheel vehicle drive train which may utilize the present invention is diagramatically illustrated and designated by the reference number 10. The four-wheel vehicle drive train 10 includes a prime mover 12 which is coupled to and directly drives a transmission 14. The output of the transmission 14 directly drives a transfer case assembly 16 which provides motive power to a primary or rear drive driveline 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front driveline 30 comprising a secondary or front prop shaft 32, a secondary or front differential 34, a pair of live secondary or front axles 36 and a respective pair of secondary or front tire and wheel assemblies 38. The front tire and wheel assemblies 38 may be directly coupled to a respective one of the front axles 36 or, if desired, a pair of manually or remotely activatable locking hubs 42 may be operably disposed between the front axles 36 and a respective one of the tire and wheel assemblies 38 to selectively connect same. Finally, both the primary driveline 20 and the secondary driveline 30 may include suitable and appropriately disposed universal joints 44 which function in conventional fashion to allow static and dynamic offsets and misalignments between the various shafts and components.

Disposed in sensing relationship with each of the rear tire and wheel assemblies 28 is a wheel speed sensor 48. Preferably, the wheel speed sensors 48 may be the same sensors utilized with, for example, an antilock brake system (ABS) or other vehicle control or traction enhancing system. Alternatively, a single sensor, disposed to sense rotation of the primary or rear prop shaft 22 may be utilized. Signals from the sensors 48 are provided in lines 52 to a microprocessor 56. Similarly, disposed in sensing relationship with the front tire and wheel assemblies 38 are respective wheel speed sensors 58 which provide signals to the microprocessor 56 in lines 62. Once again, the sensors 58 may be a part of or shared with an antilock brake system or other traction control system.

Typically an operator selectable switch 64 may be utilized and is generally disposed within reach of the vehicle operator in the passenger compartment (not illustrated). The switch 64 may be adjusted to select various operating modes such as two-wheel high gear, automatic, i.e., on-demand or adaptive operation, four-wheel high gear or four-wheel low gear depending upon the particular vehicle and configuration of the transfer case assembly 16. One such system which provides torque delivery to the secondary driveline 30 in increments or decrements in response to a sensed wheel speed difference between the primary driveline 20 and the secondary driveline 30 is disclosed in U.S. Pat. No. 5,407,024.

Figure 2:
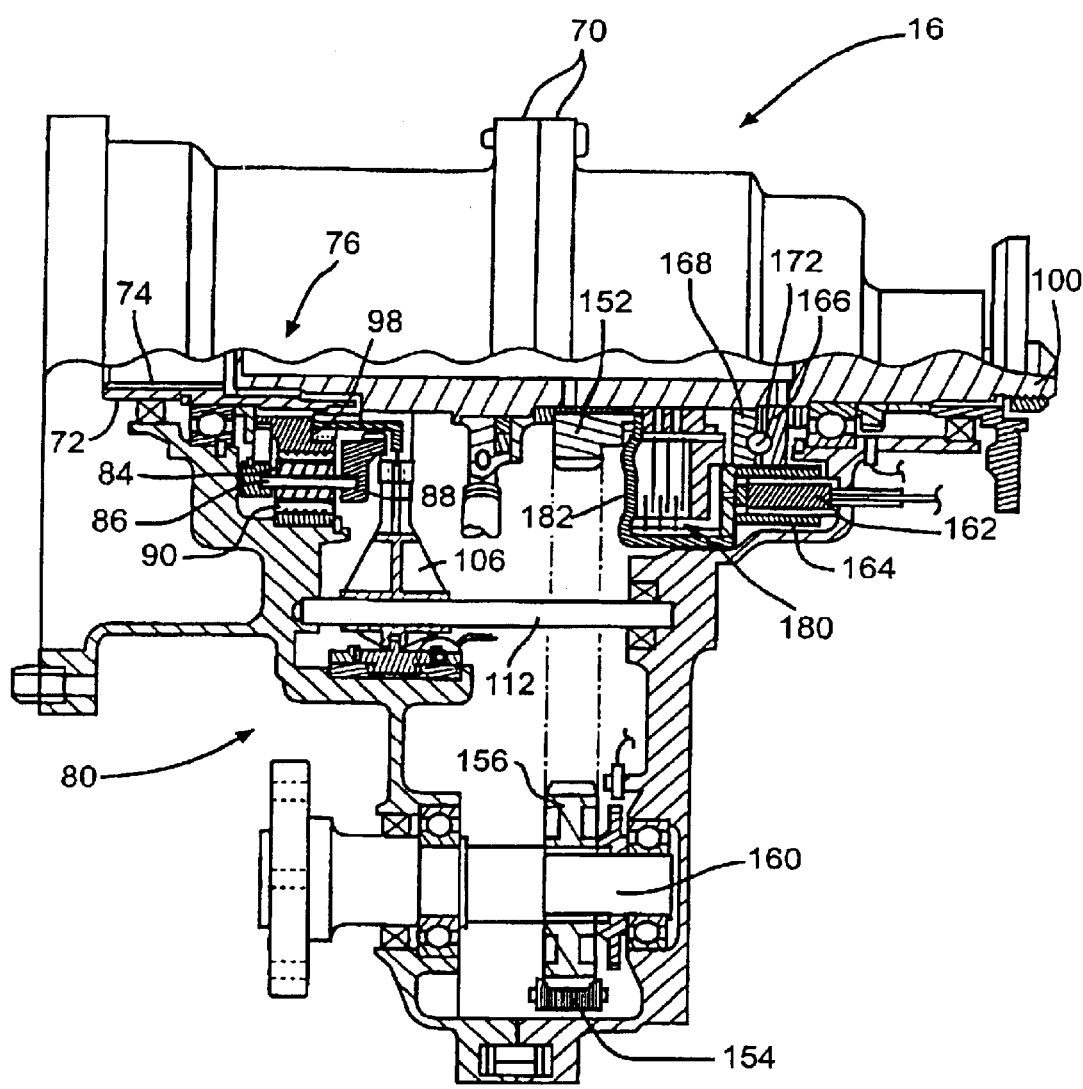
FIG. 2 is a side, elevational view in partial section of a transfer case incorporating a shift mechanism according to the present invention.

Referring now to FIG. 2, a typical two-speed transfer case assembly 16 incorporating the present invention includes a multiple piece housing 70 having a plurality of planar sealing surfaces, openings for shafts and bearings and various recesses, shoulders, counterbores and the like which receive various components or assemblies of the transfer case assembly 16. An input shaft 72 includes female or internal splines 74 or other suitable coupling structures which drivingly engage and couple the output of the transmission 14 illustrated in FIG. 1 to the input shaft 72. The input shaft 72 provides motive power to a planetary gear speed reduction assembly 76 which is controlled by a shift assembly 80 to selectively provide a first, direct drive speed range (high gear), neutral and a second, reduced speed drive range (low gear).

Figure 3:
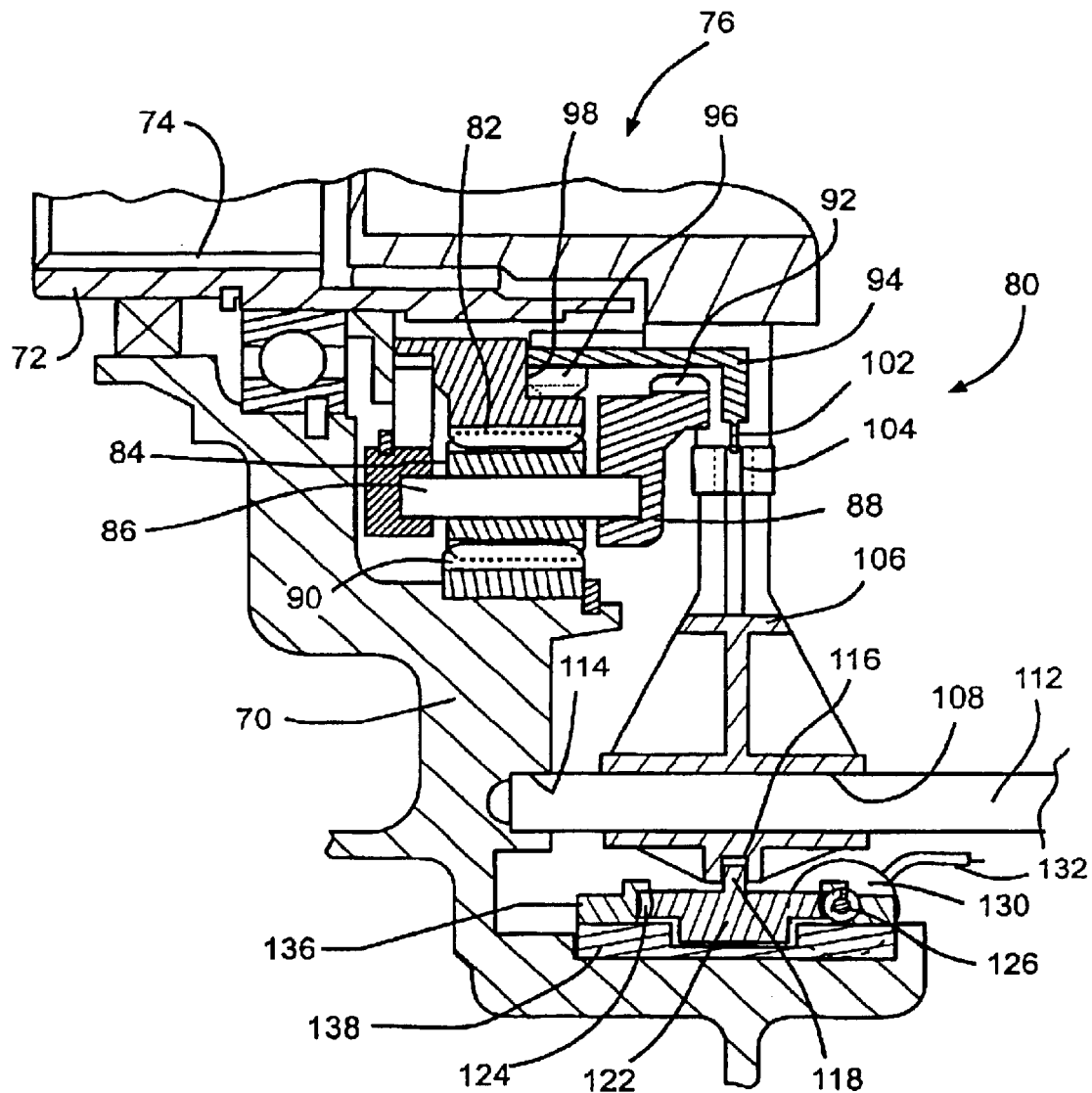
FIG. 3 is an enlarged, fragmentary front, elevational view in partial section of a shift assembly according to the present invention.
Figure 4:
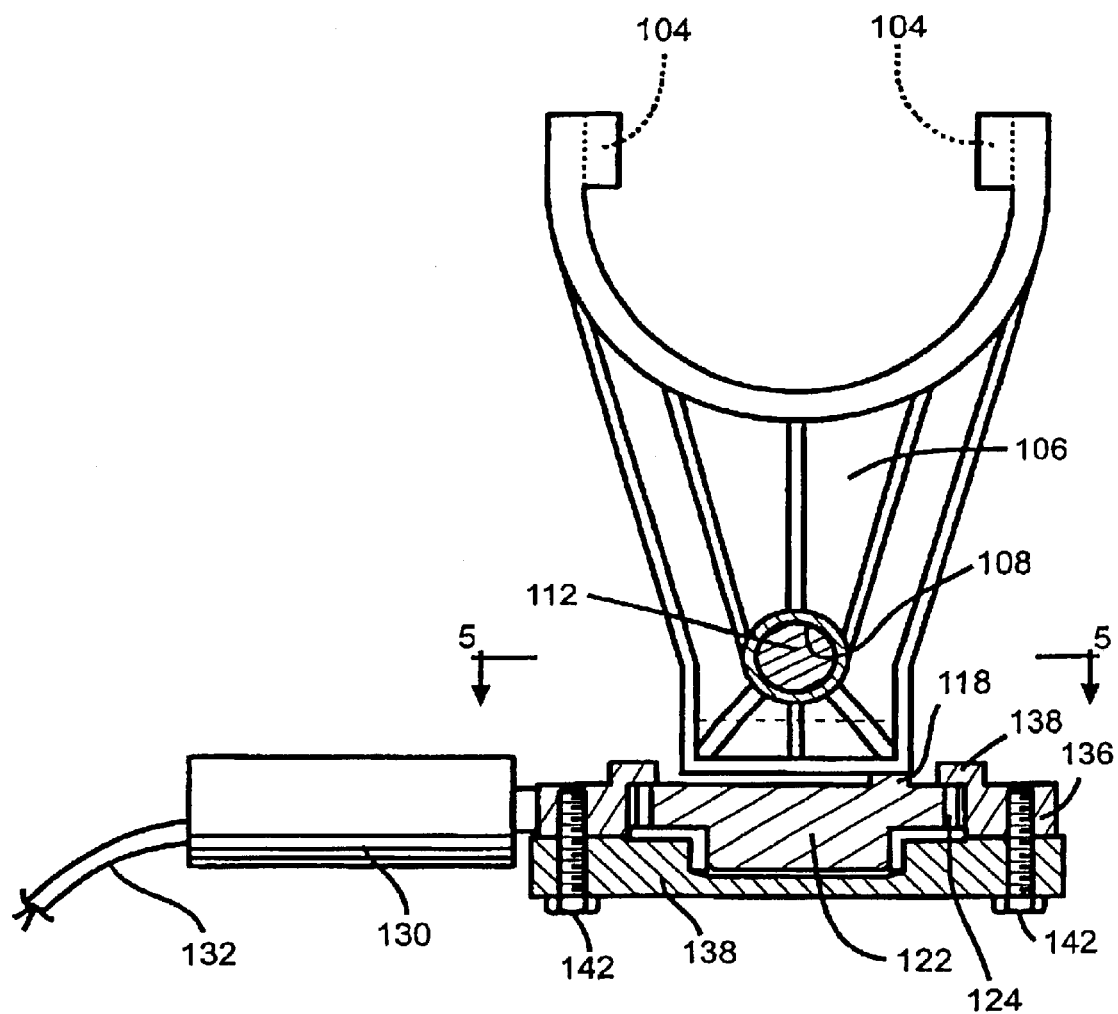
FIG. 4 is a side, elevational view of a shift assembly according to the present invention.
Figure 5:
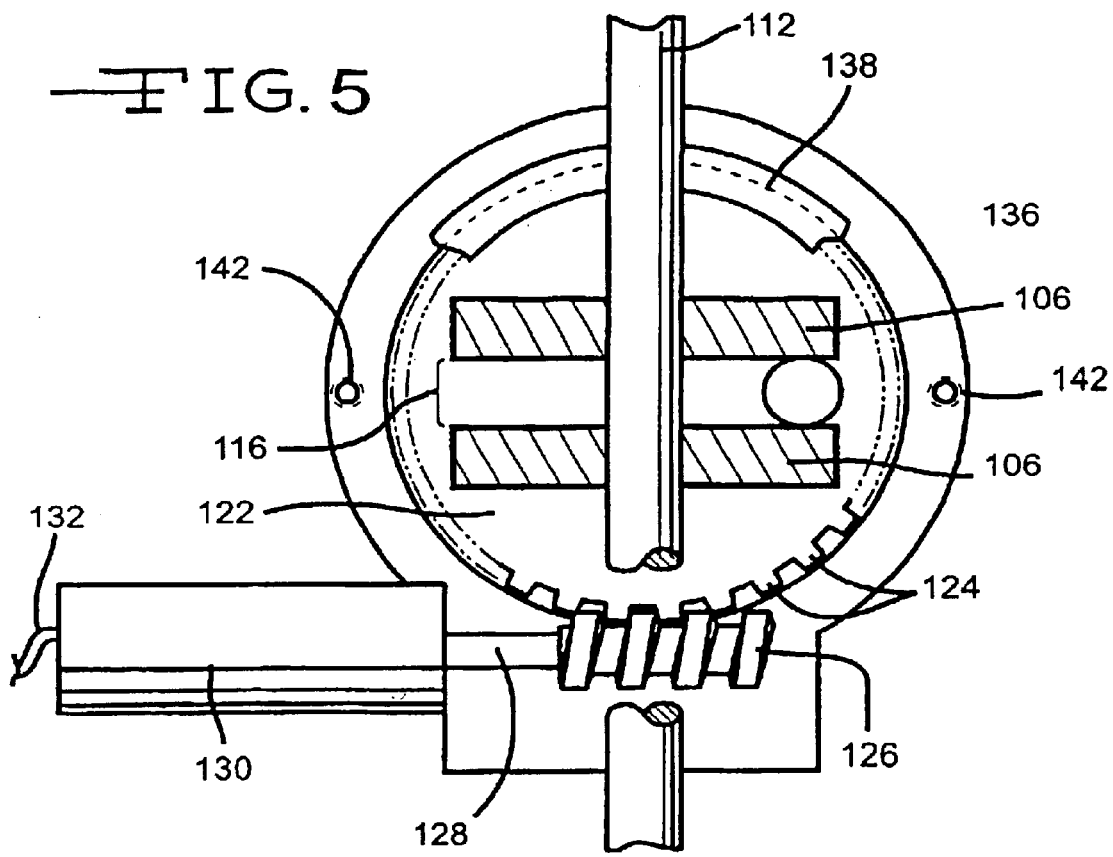
FIG. 5 is a fragmentary, full sectional view of a shift assembly according to the present invention taken along line 5—5 of FIG. 4.

Referring now to FIGS. 2 and 3, the planetary gear speed reduction assembly 76 includes a sun gear 82 which may be integrally formed with the input shaft 72 or reside on a collar or other component coupled to and driven by the input shaft 72. In meshed engagement with the sun gear 82 are a plurality of planet gears 84, one of which is illustrated in FIG. 3. Each of the planet gears 84 is rotatably supported upon a stub shaft 86 which is mounted within and secured to a carrier 88. Each of the planet gears 84 engages a stationary ring gear 90. The carrier 88 includes a set of internal or female gear teeth 92 at its end opposite the input shaft 72. A clutch collar 94 includes male splines or gear teeth 96 which are aligned with and engagable by the female splines or gear teeth 92 on the carrier 88. The sun gear 82 also includes female splines or gear teeth 98 about its interior which are aligned with and engageable by the teeth 96 of the clutch collar 94. The splines or gear teeth 96 engage the female splines or gear teeth 98 thereby providing high gear or direct drive when the clutch collar 94 is moved to the left into the position illustrated in FIG. 3. The clutch collar 94 may move to the right wherein the male splines or gear teeth 96 engage the female splines or gear teeth 92 on the carrier 88 to provide a reduced speed drive or low gear. The clutch collar passes through a center, intermediate or neutral position wherein neither high gear nor low gear is operable. The clutch collar 94 also includes a radially and circumferentially extending flange 102 which is engaged by correspondingly configured notches 104 defined by a shift fork assembly 106. The shift fork assembly 106 also defines a preferably circular through passageway 108 which is oriented perpendicularly to the notches 104. A through passageway 108 receives a preferably cylindrical support rail 112 which is received within suitable openings 114 in the housing 70 of the transfer case assembly 16. Thus, the shift fork assembly 106 may move linearly and bi-directionally along the axis of the cylindrical rail 112 and cause corresponding bi-directional linear and axial motion of the clutch collar 94. Referring now to FIGS. 3, 4 and 5, the shift fork 106 also defines a transverse slot 116 which extends perpendicularly to the axis of the cylindrical rail 112.

The transverse slot 116 receives a circular drive pin 118 which is eccentrially disposed and extends perpendicularly from a worm driven gear 122. The worm driven gear 122 includes gear teeth 124 about its periphery which are complementary to and engageable by an adjacent, engaging worm gear 126. The worm gear 126 is disposed and secured upon an output shaft 128 of an electric motor 130.

As will be explained in greater detail subsequently, the electric motor 130 may be either a uni-directional or bi-directional motor. Furthermore, the gear drive between the electric motor 130 and the final driven element including the eccentric drive pin 118 may be a train of spur and pinion gears or other speed reducing arrangement. A train of spur and pinion gears does not, however, provide the anti-back drive feature of the worm gear configuration which is highly desirable to prevent back drive of the driven gear 122 by forces transmitted through the shift fork assembly 106. The electric motor 130 is provided with electrical energy through suitable electrical conductors 132. Preferably, the worm driven gear 122 is disposed and retained within a suitable housing which may include an upper circular housing 136 having a retaining flange 138 which is secured to a lower complementary housing member by, for example, threaded fasteners 142 or rivets, or autogenous bonding or other suitable and durable attachment means.

Referring again to FIG. 2 and details of the transfer case assembly 16, a modulating clutch assembly 150 is operably disposed between the primary output shaft 100 and a chain drive sprocket 152 freely rotatably disposed about the primary output shaft 100. The chain drive sprocket 152 is engaged by a drive chain 154 which also engages a driven chain sprocket 156 which is secured to a secondary output shaft 160. The secondary output shaft 160 is coupled to and drives the secondary driveline 30.

The modulating clutch 150 may be of any configuration utilizing an electromagnetic coil to cause motion of an associated device which results in compression of a friction clutch pack to a degree corresponding to the intensity of the drive signal to the electromagnetic coil. Thus, while the invention is described in conjunction with a clutch operator referred to as a ball ramp operator, direct acting coils and bidirectional drive motors driving the clutch through, for example, gear reductions, sector plates and cams as well as other actuator configurations are all considered to be within the purview of the present invention.

The modulating clutch 150 includes an electromagnetic coil 162 which is surrounded by a rotor 164 which is coupled to a first circular member 166. The first circular member 166 is disposed adjacent a second circular member 168. Adjacent, opposed circular members 166 and 168 include symmetrically configured ramped recesses which receive load transferring balls 172. In accordance with well known principles of operation, energization of the coil 162 creates drag in the rotor 164 and associated first circular member 166 causing relative rotation between the first and second circular members 166 and 168 and driving the second circular member 168 toward a friction clutch pack 180 which is thereby compressed. The friction clutch pack comprises a plurality of interleaved clutch plats or discs, a first portion of which are drivingly coupled by, for example, a splined interconnection to the primary output shaft 100 either directly or through an intermediate hub. The other portion of the plates or discs are coupled by, for example, a splined interconnection to a bell housing 182. Drive torque is thus transferred from the primary output shaft 100 through the compressed, interleaved plates or discs of the friction clutch pack 180 to the bell housing 182 which is coupled to and drives the chain drive sprocket 152. The chain drive sprocket drives the chain 154 which drives the driver chain sprocket 156 and the secondary output shaft 160. Reduction of the energization of the coil 162 reduces the just described torque transfer.

Turning again to FIGS. 2, 3 and 4, and especially FIG. 5, the operation of the shift assembly 80 will be described. As noted above, the shift assembly 80 is primarily intended to shift an axially movable shift element such as the shift collar 94 or similar clutch device between a first axial position wherein the shift collar 94 engages a first drive (or driven) member to provide a drive at a first speed range and a second drive (or driven member) to provide drive at a second, distinct speed range. Intermediate the first and second axial positions, the shift assembly 80 and specifically the shift collar 94 may define and reside at a neutral position wherein the shift collar 94 is quiescent and disconnected from both of the drive (or driven) members.

Such axial motion of a shift collar 94 is achieved by unidirectional or bidirectional rotation of the electric motor 130 and the worm driven gear 122 which is coupled to the shift collar 94 through the shift fork 106. Specifically, the shift fork 106 includes the transverse slot 116 which receives the eccentrically disposed drive pin 118 which extends perpendicularly from the worm driven gear 122.

The position of the shift fork 106 may be determined by utilizing a stepping motor as the electric motor 130 and counting the revolutions thereof or utilizing an ancillary position sensing device utilizing, for example Hall effect sensors (not illustrated).

Figure 6:
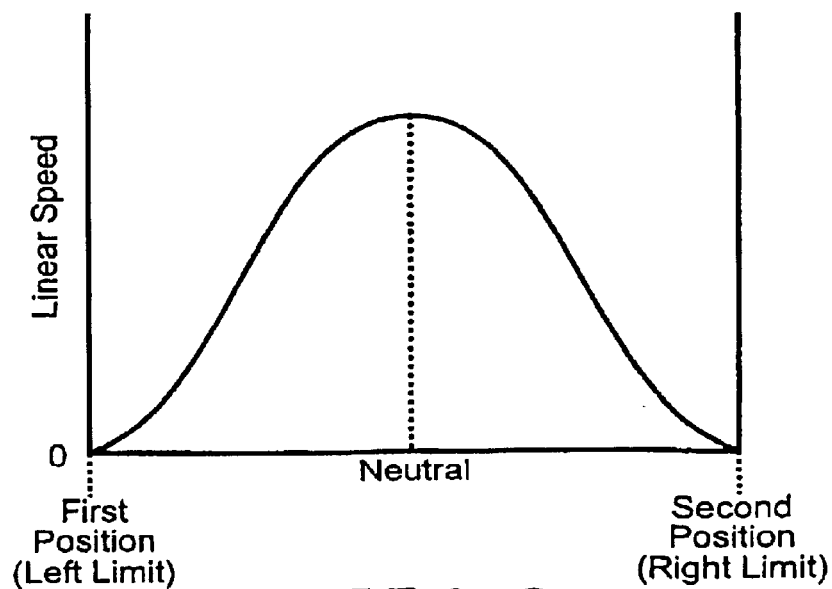
FIG. 6 is a graph illustrating the relationship between the relative speed of the driven components of a shift assembly and the position of such shift components.

Referring now to FIGS. 5 and 6, among the benefits of the present invention is the relationship and operation of the rotating worm driven gear 122 relative to the position of the shift fork assembly 106 and the clutch collar 94. This relationship is that of a cosine wave in that as the worm driven gear 122 rotates to a position such that the circular drive pin 118 is generally aligned with the cylindrical rail 112 as illustrated in FIG. 5, that is, a position wherein the shift fork assembly 106 and the clutch collar 94 are reaching one of the two axial limits of their travel or just beginning to move away from such axial limits which corresponds to those positions where the gear teeth are about to engage or disengage, it will be appreciated that the force generated through the just described mechanism is reaching its maximum while the rate of motion of the shift fork assembly 106 and the shift collar 94 is slowing and, in fact, momentarily becomes zero as the circular drive pin 118 aligns with the cylindrical rail 112, again as referenced in FIG. 5 and illustrated in FIG. 6. Thus, where maximum force is needed to engage or disengage the gears of, for example, the planetary gear assembly 80 and in that position where it is desirable to most accurately stop the shift fork assembly 106 in the fully engaged position of the gears, the shift assembly 80 achieves these goals.

Likewise, when the circular drive pin 118 is in the position illustrated in FIG. 5 farthest offset from the axis of the cylindrical rail 112 and in a position which, if needed, corresponds to a neutral position of the shift collar 94, the shift fork assembly 106 and the shift collar 94 are moving at a maximum speed with the lowest generated force. Thus, the shift assembly 80 quickly moves the shift fork assembly 106 and the shift collar 94 between its first and second engaged positions at its fastest speed midway between its two axial limits. The operation of the shift assembly 80 can thus be considered and related to, as noted above, a cosine wave which slows at the limits of travel and in fact, momentarily stops and provides motion halfway between the limits of travel at maximum linear speed. This relationship between the worm driven gear 122 and the shift fork assembly 106 enhances the accuracy and repeatability with which the axial travel limits of the shift fork assembly 106 are found and thus the accuracy and repeatability of positive and complete gear engagement. Furthermore, since maximum force is developed near and at the axial travel limits of the shift fork assembly 106, the size, weight and electrical power consumption of the electric motor 130 may be smaller than that of a sift mechanism that does not exhibit the force/travel relationship just described.

Lastly, it should be understood that the above described force/travel relationship and attendant benefits accrue with either a unidirectional or bi-directional electric motor 130.

The foregoing disclosure is the best mode devised by the inventor for practicing this invention. It is apparent, however, that apparatus and methods incorporating modifications and variations will be obvious to one skilled in the art of shift mechanisms. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A shift assembly for a single rail shift mechanism comprising, in combination:

a motor having an output;

a first gear coupled to said output;

a second gear engaged by said first gear and defining an axis of rotation;

a drive pin extending from said second gear and radially offset from said axis of rotation;

a shift rail;

a shift fork disposed for bi-directional translation on said shift rail and defining a slot for receiving said drive pin, whereby rotation of said motor causes translation of said shift fork along said shift rail.

2. The shift assembly of claim 1 wherein said first gear is a worm gear.

3. The shift assembly of claim 1 wherein said motion of said shift fork is sinusoidal.

4. The shift assembly of claim 1 wherein said shift rail extends perpendicularly of said slot.

5. The shift assembly of claim 1 wherein said axis of rotation is perpendicular to said shift rail.

6. The shift assembly of claim 1 wherein said motor is unidirectional.

7. A shift mechanism for a single rail shift assembly comprising, in combination:
   a motor having an output;
   a rotating member defining an axis of rotation and pin extending from said rotating member and radially offset from said axis of rotation;
   a gear train rotationally engaging said motor output and said rotating member;
   a shift rail,
   a shift fork disposed for bi-directional translation and along said shift rail defining a slot for receiving said pin;
   whereby rotation of said motor causes bi-directional translation of said shift fork on said shift rail.

8. The shift assembly of claim 7 wherein said gear train includes a worm gear and a worm driven gear.

9. The shift assembly of claim 7 wherein said motor rotates unidirectionally.

10. The shift assembly of claim 7 further including a shift collar engaged by said shift fork.

11. The shift assembly of claim 10 further including a speed change mechanism having a first high speed output, a second low speed output and a shift collar movable between said outputs by said shift fork.

12. The shift assembly of claim 7 wherein said motor rotates bi-directionally.

13. A shift assembly for a single rail shift mechanism comprising, in combination:
   a motor having an output;
   at least a pair of engaging gears, one of said gears coupled to said motor output and another of said gears defining an axis of rotation;
   a drive pin extending from said another of said gears and radially offset from said axis of rotation;
   a shift rail;
   a shift fork defining a slot for receiving said drive pin and a through opening for receiving said shift rail.
   whereby rotation of said motor causes translation of said shift fork along said shift rail.

14. The shift assembly of claim 13 wherein said motor rotates unidirectionally and said shift fork translates bi-directionally.

15. The shift assembly of claim 13 further including a shift collar engaged by said shift fork.

16. The shift assembly of claim 15 further including a speed change mechanism providing a first high speed output, a second low speed output and an output member translatable between said outputs by said shift fork.

17. The shift assembly of claim 13 wherein said motor rotates bi-directionally.

* * * * *